United States Patent [19]

Morrison

[11] Patent Number: 4,470,118
[45] Date of Patent: Sep. 4, 1984

[54] GAS TURBINE ENGINE FUEL CONTROL

[75] Inventor: Terry Morrison, Vernon, Conn.

[73] Assignee: Chandler Evans Inc., West Hartford, Conn.

[21] Appl. No.: 369,530

[22] Filed: Apr. 19, 1982

[51] Int. Cl.³ ............................ F02C 9/02; F02C 9/14
[52] U.S. Cl. .............................. 364/431.02; 60/39.281
[58] Field of Search ................. 364/431.02; 60/39.281

[56] References Cited

U.S. PATENT DOCUMENTS

| | | | |
|---|---|---|---|
| 2,974,483 | 3/1961 | Sanders | 60/39.281 |
| 3,307,352 | 3/1967 | Stearns et al. | 60/39.281 |
| 3,482,396 | 12/1969 | Nelson et al. | 60/39.281 |
| 3,939,649 | 2/1976 | McCabe | 60/39.281 |
| 4,117,668 | 10/1978 | Elsaesser et al. | 364/431.02 |

Primary Examiner—Felix D. Gruber
Assistant Examiner—Karl Huang

[57] ABSTRACT

The ability of a gas turbine engine to recover from surge is enhanced by implementing a closed loop control mode wherein fuel flow is varied as a function of the ratio of the rate of change of engine gas generator speed to compressor discharge pressure.

7 Claims, 2 Drawing Figures

GAS TURBINE ENGINE FUEL CONTROL

BACKGROUND OF THE INVENTION

1. Field of the Invention

The present invention relates to the exercise of control over gas turbine engines and particularly to controlling the rate of delivery of fuel to the gas generator of a free turbine engine employed as the power plant for a rotary wing aircraft. More specifically, this invention is directed to a closed loop gas turbine engine fuel control wherein fuel flow is varied as a function of the ratio of the rate of change of gas generator speed to compressor discharge pressure. Accordingly, the general objects of the present invention are to provide novel and improved methods and apparatus of such character.

2. Description of the Prior Art

Gas turbine engines are subject to the operating condition known as "surge", i.e., a mismatch in the speed of the compressor blades and the incoming air. When the surge condition occurs there is a large loss of power, a loss of air flow, an increase in temperature and substantial mechanical vibration. The surge condition is usually encountered during engine acceleration when the rate of delivery of fuel to the gas generator becomes excessive.

Prior art gas turbine engine controls may be generally characterized as being of either the "open" or "closed" loop type. Open loop controls are scheduling devices wherein the fuel flow to the engine is varied as a function of speed. Thus, open loop gas turbine engine controls are insensitive to changes in the fuel control itself, changes in the engine or changes in the characteristics of the fuel being supplied to the engine. Prior closed loop gas turbine engine fuel controls typically operate in a mode wherein the rate of change of the gas generator shaft speed is determined and fuel flow to the engine is varied so as to match schedules devised when the engine was new. Thus, the prior art closed loop control may have a speed governor which, under steady state conditions, demands a fuel flow as a function of gas generator speed. The control will also have an acceleration schedule which will set the fuel flow rate during acceleration. A surge margin will be built into the acceleration schedule. Because of this surge margin, the accelerating engine will be able to accept a predetermined percent of additional fuel flow before it will enter the surge condition. Since the engine and/or fuel control may undergo changes in operating characteristics with extended use, the surge margin may actually decrease with time. If excess fuel is delivered to the engine when it is in the surge condition, for example because the surge margin has decreased and thus the acceleration schedule is actually calling for excess fuel, it is possible that the engine will either stay in surge or be subjected to multiple surges.

Continuing to discuss prior art closed loop gas turbine engine fuel controls, it has been conventional practice to select the appropriate fuel flow as a function of the ratio of the rate of change of gas generator speed, NDOT, to compressor inlet pressure, PT2. While experience has shown that such a closed loop NDOT/PT2 acceleration control results in enhanced performance when compared to an open loop control, during engine surges an NDOT/PT2 control will attempt to increase fuel flow to compensate for the stalled acceleration. This increases the probabililty that the engine will not accelerate through the surge prone area and multiple surges will occur thus requiring pilot intervention.

SUMMARY OF THE INVENTION

The present invention overcomes the above-briefly discussed and other deficiencies and disadvantages of the prior art by providing a novel and improved gas turbine engine fuel control operating mode which is characterized by significantly enhanced ability of the engine to recover smoothly from surge. Further, the control technique of this invention is substantially immune to surge margin loss resulting from fuel control deterioration or damage. In accordance with the technique of the present invention fuel flow to the gas generator of a gas turbine engine is varied such that the ratio of the rate of change of gas generator speed to compressor discharge pressure satisfies the fuel control's demand.

Apparatus in accordance with the present invention comprises a closed loop electronic fuel control wherein, during acceleration, fuel flow to the gas turbine engine will be manipulated to meet the scheduled function of the ratio of the rate of change of gas generator speed over gas generator compressor discharge pressure to corrected gas generator speed. This scheduled acceleration NDOT/CDP will be varied as a function of actual sensed CDP. During "steady state" conditions, an NDOT/CDP signal which is a function of either gas generator or power turbine speed error will be selected as the fuel flow control signal. The selected NDOT/CDP command will be varied in the same manner as the acceleration NDOT/CDP signal by a signal commensurate with the actual compressor discharge pressure to produce an NDOT signal. Under either steady state, accelerating or decelerating engine conditions the generated NDOT signal will be compared with the actual measured NDOT to produce an error signal. This NDOT error signal is nulled through an integral plus proportional NDOT governor which operates through fuel flow per compressor discharge pressure ratio units. The commanded fuel flow to the engine is computed as a function of the output of the NDOT governor and CDP.

BRIEF DESCRIPTION OF THE DRAWING

The present invention may be better understood and its numerous objects and advantages will become apparent to those skilled in the art by reference to the accompanying drawing wherein.

DESCRIPTION OF THE DISCLOSED EMBODIMENT

Figure 1:
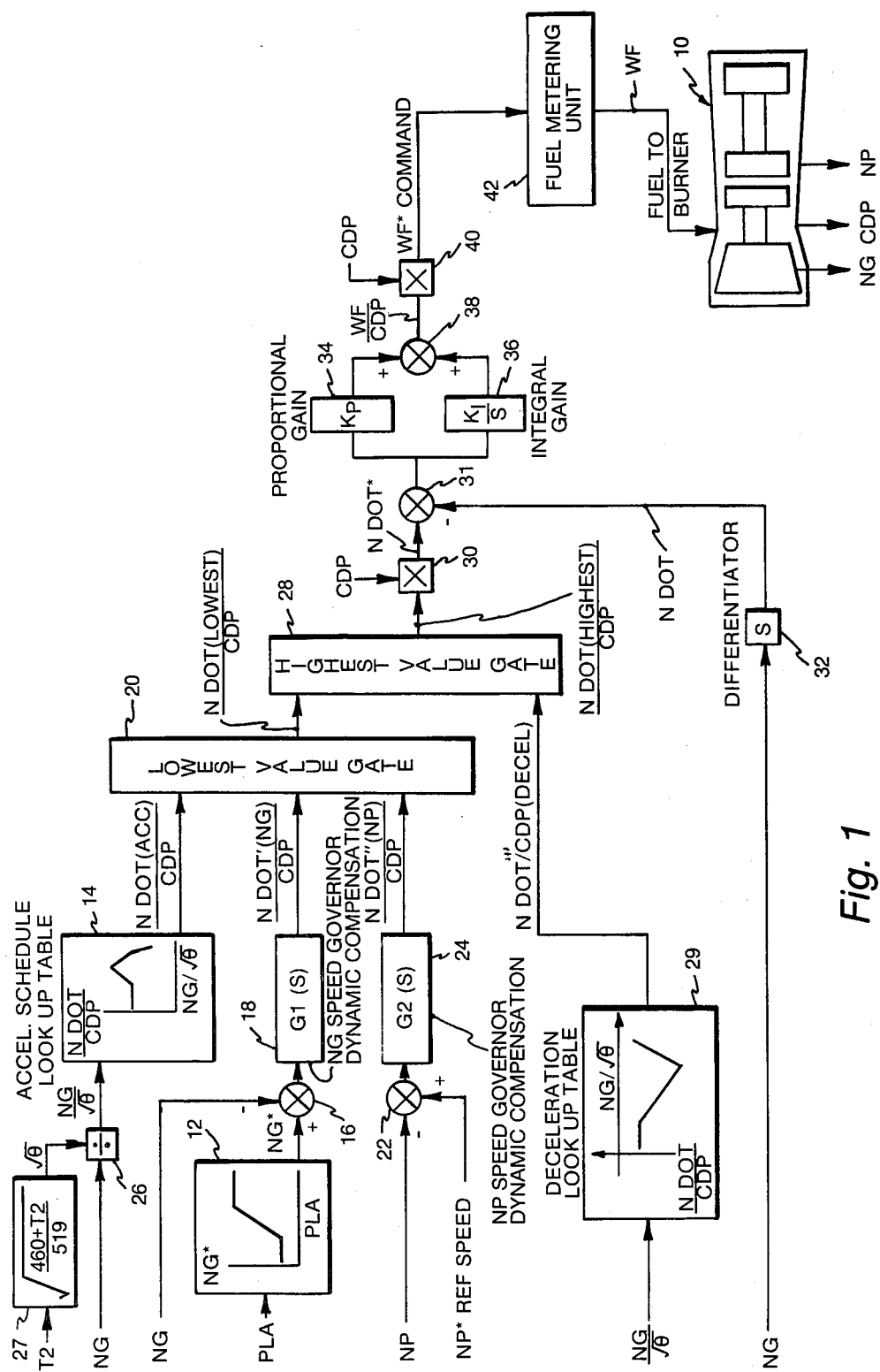
FIG. 1 is a functional block diagram of a gas turbine engine control in accordance with the present invention.

With reference now to the drawing, the intent of the present invention is to provide for the exercise of control over the delivery of fuel to a gas turbine engine which has been indicated generally at 10. Engine 10, for purposes of explanation, may be considered to be a free turbine type engine comprising a gas generator and a free turbine which is driven by, but mechanically decoupled from, the gas generator. In accordance with prior art practice, engine 10 will be instrumented so as to provide, among other information, signals commensurate with gas generator speed NG, compressor discharge pressure CDP, power turbine speed NP and compressor inlet temperature T2. The aforementioned signals will comprise inputs to the electronic fuel control of the present invention. An additional input to the fuel control will comprise a PLA signal commensurate with the angle or setting of the pilot's power lever.

The engine manufacturer will provide information commensurate with the desired gas generator speed NG*, i.e., the gas generator speed demand, corresponding to each setting of the pilot's power lever. This information will be stored in a first memory, i.e., a look-up table, 12. The engine manufacturer will also provide information from which an acceleration schedule, with an appropriate surge margin, may be determined. This acceleration schedule will comprise a plot of NDOT/CDP versus $NG\sqrt{\theta}$. The acceleration schedule will also be stored in a memory, i.e., a second look-up table, 14.

The PLA signal is employed to address memory 12 whereby the NG* signal commensurate with PLA will be read out of the memory and applied as a first input to a summing circuit 16. The second input to summer 16 will be the actual NG signal derived from the engine sensor. The output of summer 16 will thus be a NG error signal which is delivered as an input to a gas producer speed governor 18. The actual circuitry comprising governor 18 will depend upon the characteristics of engine 10. Typically, governor 18 will be a lead-lag circuit which produces an output signal which results in the fuel control being responsive and stable over the entire flight envelope. Such governors are well known in the art. The output of governor 18 will be an NDOT'/CDP speed governor signal which is a function of gas producer speed error. This error signal, when compensated for the dynamics of the fuel control and engine, comprises an NDOT/CDP signal because of the gain of the governor 18.

The NDOT'/CDP speed governor signal from governor 18 is delivered as a first input to a first auctioneering circuit 20. A second input to circuit 20, which functions as a 'least wins' gate, comprises an NDOT"/CDP speed governor signal which is a function of power turbine speed error. The NDOT"/CDP speed governor signal is produced by summing, at a summing juction 22, the actual power turbine speed NP with a power turbine speed reference provided by a cockpit instrumentation input.

The NP error signal produced by summer 22 is delivered as an input to a power turbine governor 24. Governor 24 is a second dynamic compensation circuit which causes the NDOT"/CDP speed governor signal to vary as required to ensure that, in the power turbine speed error governing mode, the fuel control will be stable and responsive. Governor 24 may, for example, include a notch filter with a first order lag.

The third input to auctioneering circuit 20 is an NDOT/CDP signal derived from the acceleration schedule stored in memory 14. In order to read the appropriate NDOT/CDP value from memory 14, the memory is addressed by the $NG/\sqrt{\theta}$ signal provided by dividing, in a division circuit 26, the signal commensurate with sensed gas generator speed by the $\sqrt{\theta}$ signal provided, in response to the T2 input, by an inlet temperature correcting circuit 27.

It is to be noted that there may be additional inputs to auctioneering circuit 20 such as, for example, an NDOT/CDP signal which is a function of the engine temperature limits. Auctioneering circuit 20 selects, for passage, that one of the input signals thereto which represents the lowest demanded NDOT/CDP. The selected NDOT/CDP signal is applied as a first input to a "highest wins" gate 28. The second input to gate 28 is an NDOT'''/CDP (decel) signal derived from a deceleration schedule, based on engine manufacturer supplied data, stored in a memory 29. Memory 29 is addressed by the $NG/\sqrt{\theta}$ signal provided by divider 26.

Gate 28 passes that one of the input signals thereto which represents the higher demanded NDOT/CDP to a multiplier 30. The second input to multiplier 30 is the actual sensed CDP signal. Accordingly, multiplier 30 provides, to a summing junction 31, an NDOT* demand signal. The NG signal is also applied to a differentiator 32 to thereby provide an actual NDOT signal which is delivered as a second input to summing junction 31. Algebraic summation of the NDOT* and NDOT signals produces an NDOT error signal which is simultaneously delivered to a proportional gain compensation circuit 34 and integral gain compensation circuit 36. By subjecting the NDOT error signal to proportional plus integral gain compensation, the signals from compensation circuits 34 and 36 being recombined at a summing junction 38, a WF/CDP signal is generated. Thus, the compensation circuits 34 and 36 comprise an NDOT governor which operates through fuel flow/compressor discharge pressure ratio units The WF/CDP signal from summing junction 38 is applied as a first input to an altitude compensation circuit 40 which may comprise a multiplier. The second input to the altitude compensation circuit 40 is the actual CDP signal. Accordingly, the output of compensation circuit 40 is a signal which corresponds to the selected fuel flow demand WF*. In response to this WF* input, a metering device 42 causes delivery of a fuel flow WF to engine 10.

The above-described NDOT/CDP mode of control takes advantage of the NDOT characteristics of the engine while including altitude compensation and surge recovery, the latter being a result of the use of the compressor discharge pressure as an NDOT scheduling parameter rather than merely for altitude compensation purposes. Surge recovery is further enhanced since operating the NDOT error signal through WF/CDP results in decreasing fuel flow with the drop in compressor discharge pressure resulting from an engine surge. Since the drop in CDP resulting from an engine surge is a measure of the severity of the surge, controlling on CDP in accordance with the present invention results in the reduction of fuel flow produced when a surge occurs being proportional to the severity of the initial surge.

Figure 2:
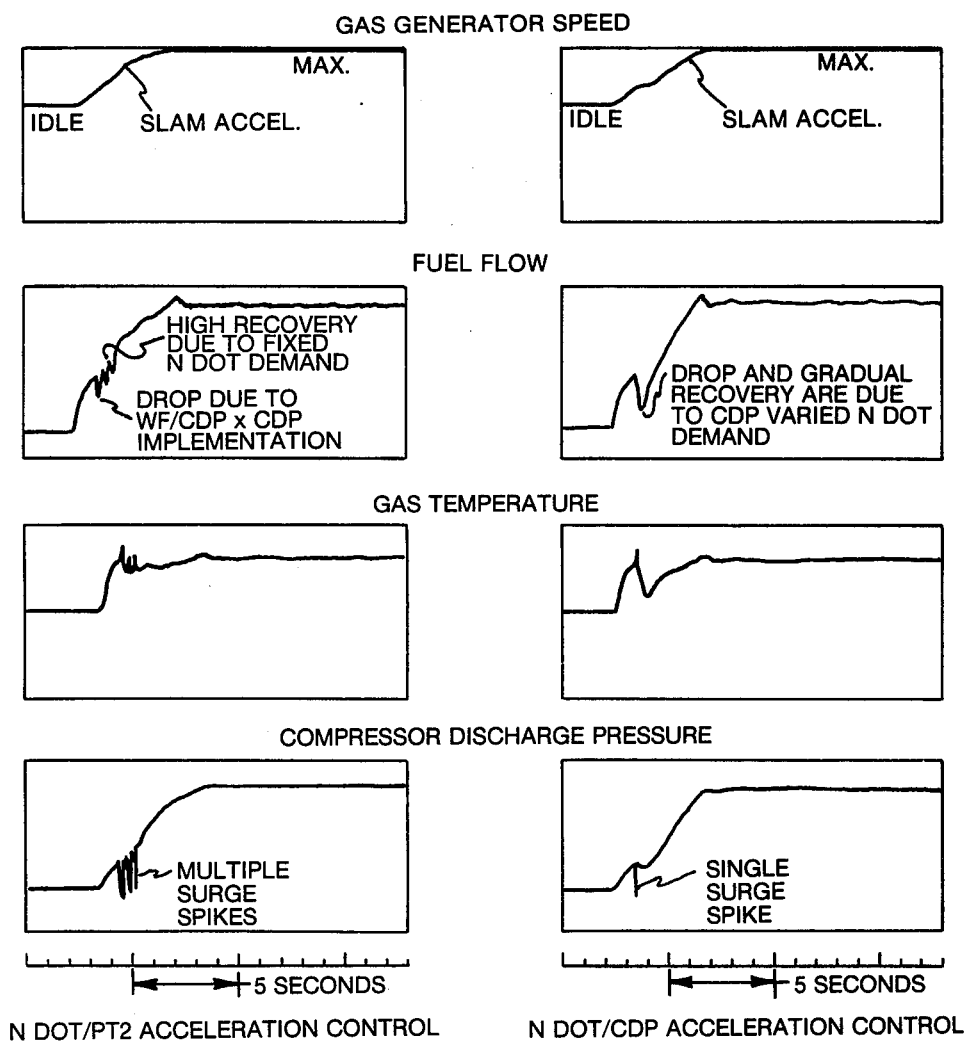
FIG. 2 comprises a graphical comparison of the operation of present invention with the prior art.

The benefits incident to the above-described mode of operation may be seen by reference to FIG. 2 which is a graphical comparison of the operation of the present invention with that of a prior closed loop electronic fuel control where compressor inlet pressure, PT2, rather than CDP was a fuel flow rate modifying input parameter. FIG. 2 compares gas generator speed, fuel flow, gas temperature and compressor discharge pressure for a simulation of the operation of the same engine, under the two modes of control, during acceleration. The comparison of the compressor discharge pressure under the two modes of operation is particularly significant. In accordance with the prior art control mode multiple surges occurred whereas, in accordance with the present invention, only a single surge spike was encountered. Bearing in mind that a surge subjects the engine, and particularly the turbine blades, to severe stresses, the present invention is clearly a substantial improvement over the prior art.

To summarize the present invention, a fuel flow demand which is a function of NDOT is varied as a function of the instantaneous CDP to provide a closed loop control mode that inherently optimizes surge recovery and minimizes the likelihood of multiple or hung surges. The control mode of the present invention is particularly well suited to implementation using existing microprocessor technology for selecting the appropriate points on an acceleration schedule and steady state fuel flow schedule.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a method for exercising control over the rate of delivery of a combustible fuel to a gas turbine engine, the engine having a gas generator and being operable in substantially steady state and acceleration modes, the improvement comprising:
   providing an acceleration schedule which is a function of the ratio of the rate of change of engine gas generator speed to gas generator compressor discharge pressure;
   selecting data from said acceleration schedule in accordance with existing engine operating conditions;
   modifying the selected data in accordance with the actual instantaneous compressor discharge pressure to provide a demand signal which is a function of the rate of change of gas generator speed;
   comparing the demand signal with the actual rate of change of gas generator speed to provide an error signal;
   adjusting said error signal to provide a fuel flow rate change command; and
   employing said command to determine the rate of flow of fuel to the engine.

2. The method of claim 1 wherein the selection of data from the acceleration schedule is determined by the existing ratio of gas generator speed to corrected engine inlet air temperature.

3. The method of claim 1 wherein the step of adjusting comprises:
   scaling the error signal in fuel flow per gas generator compressor discharge pressure units; and
   compensating the scaled error signal for altitude.

4. The method of claim 3 wherein the selection of data from the acceleration schedule is determined by the existing ratio of gas generator speed to corrected engine inlet air temperature.

5. The method of claim 1 further comprising:
   providing a speed governor signal as a ratio of the rate of change of engine gas generator speed to gas generator compressor discharge pressure, the speed governor signal being a function of the gas generator speed error;
   comparing the speed governor signal with the selected acceleration schedule data and selecting for modification that of the compared information commensurate with the lowest demanded ratio of rate of change of speed to compressor discharge pressure.

6. The method of claim 4 further comprising:
   providing a speed governor signal as a ratio of the rate of change of engine gas generator speed to gas generator compressor discharge pressure, the speed governor signal being a function of the gas generator speed error;
   comparing the speed governor signal with the selected acceleration schedule data and selecting for modification that of the compared information commensurate with the lowest demanded ratio of rate of change of speed to compressor discharge pressure.

7. In apparatus for exercising control over the rate of delivery of a combustible fuel to a gas turbine engine, the engine having a gas generator and being operable in substantially steady state and acceleration modes, the improvement comprising:
   data storage means, said data storage means storing an acceleration schedule which is a function of the ratio of the rate of change of engine gas generator speed to gas generator compressor discharge pressure;
   means for reading stored data from said storage means, said reading means providing an address signal which is a function of the ratio of gas generator speed to gas generator corrected compressor inlet temperature;
   means responsive to the data read out of said storage means and to a signal commensurate with actual compressor discharge pressure for modifying the acceleration schedule data;
   means for comparing the modified acceleration schedule data with the actual rate of change of gas generator speed to provide an error signal; and
   means responsive to said error signal for varying the rate of delivery of fuel to the engine.

* * * * *